United States Patent Office

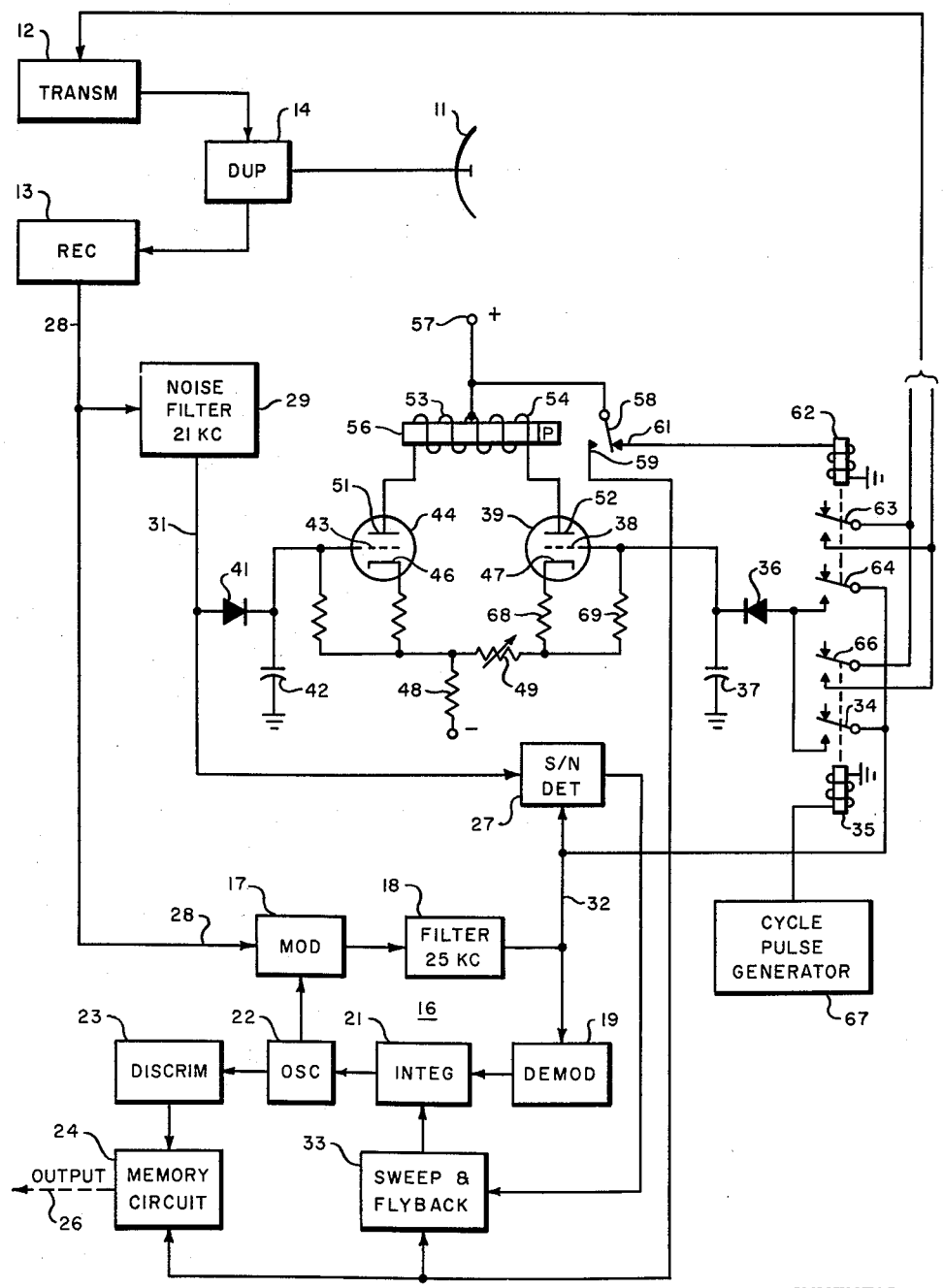

3,118,140
Patented Jan. 14, 1964

3,118,140
ANTI-JAMMING CIRCUIT
Leonard O. Vladimir, Chappaqua, and Allyn G. Smith, Pleasantville, N.Y., assignors to General Precision, Inc., a corporation of Delaware
Filed Apr. 10, 1961, Ser. No. 101,776
13 Claims. (Cl. 343—8)

This invention relates to radar instruments containing circuits to protect them from radio interference.

This invention is particularly adapted for use in airborne radar instruments wherein Doppler frequency information in received radar echo signals is employed in navigational instruments to indicate speed, drift angle, rate of climb or dive, or the like.

In Doppler speed and drift indicating systems the received signal containing the Doppler information is a microwave signal having a higher or lower frequency than that of the transmitted signal. When the received signals are suitably demodulated a Doppler difference frequency spectrum is obtained. This spectrum is fairly wideband, and for accuracy its center frequency must be found.

In order to ascertain and measure the central Doppler frequency and to track changes in it a frequency tracker is employed. This component is used with a search circuit which, on initial operation or on losing the signal, continuously scans the Doppler frequency band, perhaps from 2 kc.p.s. to 19 kc.p.s., for a Doppler signal. When found, the circuit stops scanning and the tracker locks to the signal. During scanning, the tracker outputs are locked at their last data values, this being termed the memory mode of operation. When the tracker is locked to a signal, operation is termed in the normal mode.

A more detailed explanation of the circuits controlling transfers between memory mode and normal mode operation can be found in U.S. patent application Serial No. 77,917, to J. W. Gray et al., filed December 23, 1960, now Patent No. 3,061,830.

When high noise interference is experienced, as in deliberate jamming by a very wideband noise signal, or when the Doppler signal becomes weak, a component termed the signal-to-noise detector transfers operation to the memory mode. However, when a more sophisticated jamming signal is encountered, closely simulating a Doppler echo signal, it is possible for the jamming signal to "capture" the frequency tracker circuit, and to cause it to forsake even a strong Doppler signal to which it has been locked and, instead, to lock to the jamming signal. The present invention provides a simple circuit for defense against such capture.

The inventive circuit secures two signals from the frequency tracker. One signal contains the Doppler signal plus some contaminating noise. The other contains noise signal only. A programmed relay at intervals silences the transmitter while permitting the receiver to function. If, during this interval, the receiver perceives a signal which is of Doppler nature and significantly stronger than the noise signal, the signal must be a jamming signal because the transmitter is silent. The jamming signal and the noise signal are applied to a differential relay and, if the jamming signal is stronger than the noise signal, the relay operates. This causes the system to go to memory operation and prevents further operation of the transmitter until the jamming signal stops.

The object of this invention is to provide a simple circuit addition to a Doppler radar system to prevent lock-on to a jamming signal.

A further understanding of this invention may be secured from the detailed description and the drawing, the single figure of which is a schematic circuit of an embodiment of the invention.

Referring now to the drawing, a Doppler navigational radar has an antenna 11, microwave transmitter 12, microwave receiver 13, and a duplexing component 14. The receiver output includes a Doppler frequency spectrum having a central frequency in the range of 2 kc.p.s. to 19 kc.p.s. The output also includes noise energy evenly distributed throughout the Doppler frequency range and beyond. The receiver output is applied to a frequency tracker, the components of the basic feedback loop 16 of such a tracker being a modulator 17, resonant filter 18 having a transmission band centered at 25 kc.p.s., a demodulator 19, an integrator 21, and an oscillator 22 adjustable in frequency between 27 kc.p.s. and 44 kc.p.s. The frequency tracker output is taken from the oscillator 22 through a discriminator 23 and a memory circuit 24. The discriminator converts the oscillator output frequency, which is proportioned to the Doppler spectrum central frequency, to a signal the amplitude of which is in turn proportional to the oscillator output frequency. The memory circuit 24 includes a position servomechanism having an output shaft 26. The angular deflection of this shaft represents the Doppler frequency and is a measure of the aircraft ground speed.

The operation of such a frequency tracker is fully described in U.S. Patent No. 2,915,748. Briefly, a Doppler spectrum having a central frequency between 2 kc.p.s. and 19 kc.p.s. is applied from conductor 28 to the modulator 17. This Doppler spectrum is modulated by the oscillator 22 output to form a difference sideband signal of approximately 25 kc.p.s. frequency and this sideband signal is in turn applied to the narrow bandpass filter 18. The output of the filter containing error information representing the difference between the filter frequency characteristic and the signal frequency is demodulated at 19 to form an error signal. This error signal, through the integrator 21, is applied to change the frequency of oscillator 22 in such direction as to eliminate the error, the oscillator frequency then equalling the Doppler frequency plus 25 kc.p.s.

Two inputs are taken from the circuit so far described for the signal-to-noise detector circuit 27 and are also employed as inputs to the instant inventive circuit. One input is taken from the output conductor 28 of the receiver 13 and applied to a bandpass filter 29 having a transmission band lying wholly outside of the Doppler frequency range. In this case the transmission band is centered at 21 kc.p.s. The output of the filter 29 is applied through conductor 31 to the signal-to-noise detector 27. The other input is taken from the output of the Doppler signal filter 18 and is applied through conductor 32 to the signal-to-noise detector 27. This input consists of a signal representing the Doppler signal together with noise within the bandwidth of the filter 18. The signal-to-noise detector circuit output is applied to control a sweep and flyback circuit 33 which, through the integrator 21, during the memory mode of operation causes the frequency tracker to scan the Doppler spectrum by sweeping down from 19 kc.p.s. to 2 kc.p.s. in about 100 seconds, then rapidly retracing to 19 kc.p.s. and repeating this cycle.

The principal components of the anti-jamming circuit take signal and noise inputs from conductors 31 and 32. Conductor 32 is connected through contacts 34 of a relay 35 to a rectifying diode 36 followed by a smoothing capacitor 37. The rectified output is applied to the control grid 38 of a triode tube 39. The input imposed on conductor 31 is applied through a rectifying diode 41, followed by a smoothing capacitor 42, to the control grid 43 of a triode tube 44. The tube cathodes 46 and 47 have a common cathode resistor 48, with an adjustable biasing resistor 49 connected in series with the cathode 47. The anodes 51 and 52 are connected through opposed differential windings 53 and 54 of a polarized relay 56 to a positive potential terminal 57. The relay contact arm 58 is also connected to terminal 57. The front fixed contact 59 is connected to and controls the sweep and flyback circuit 33 and the memory servo circuit 24. The back fixed contact 61 is connected to the winding of a relay 62. The relay 62 has a contact pair, 63, connected to the transmitter 12 through relays therein so that, when the contacts 63 are closed, the transmitter is rendered inoperative but may operate normally when the contacts 63 are open. The relay 62 also has a contact pair 64 connected in parallel to the contacts 34. The contacts 66 of relay 35 are connected in parallel to contacts 63 of relay 62. Relay 35 is connected to and operated by a cycle pulse generator 67 which, for example, cyclically operates relay 35 for one second and releases it for ten seconds.

In the operation of the anti-jamming circuit on a normal Doppler navigational signal, with the cycle pulse generator 67 in the ten-second part of its cycle, the relay 35 is unoperated and its contacts 34 and 66 are open. The Doppler-generated signal in conductor 32 therefore cannot reach the triode 39, which is rendered nonconductive or nearly so by its bias resistors 68 and 69. Little or no current flows through the differential winding 54 of relay 56.

The normal sample of noise from filter 29 is rectified by diode 41 and applied to triode 44, making it proportionally conductive and drawing current through the differential relay winding 53. The polarized relay 56 is so biased by the adjustment of resistor 49 that the winding 53 holds the contact arm 58 against its fixed contact 61. Therefore, in the normal operating condition described, the arm 58 is held against contact 61 holding relay 62 in its operated condition and its contacts 63 and 64 are open as shown in the drawing.

Once each 11 seconds the generator 67, by exciting relay 35, tests for the existence of a jamming signal. When relay 35 operates it closes contacts 66, silencing the transmitter 12, and closes contacts 34, permitting any signal in conductor 32 to be rectified and applied to triode 39. If no jamming or other tuned interference signal exists, there will be only a noise signal in conductor 32 comparable in intensity with the noise signal in conductor 31. The currents in the two windings 53 and 54 of the differential relay will therefore be substantially equal in amount and opposite in polarization and the effects thereof substantially cancel each other. Additionally, the adjustable resistor 49 is adjusted so that in this situation the relay arm 58 will rest on contact 61. Therefore the normal operation of the system will not be disturbed and, after release by generator 67 of relay 35, will be resumed.

If, however, during the one-second operation of the relay 35 a Doppler-like signal should exist in conductor 32, it could only come from a jamming signal or other radar interference, since the transmitter 12 has been silenced. This signal, plus the noise associated therewith, produces a current in the differential winding 54 overpowering that in winding 53 and causes the arm 58 to operate to contact 59. This releases relay 62, which closes its contacts 63, holding the transmitter in its inoperative condition. Contacts 64 are also closed permitting the continued application of the interference derived signal to the triode 39. The circuit is thus locked in this condition, in which it remains continuously without regard to the cyclic operation of relay 35 as long as the interference continues. The closing of contact 59 energizes the sweep and flyback circuit 33 and the memory circuit 24, placing the system in the memory mode. The system output shaft 26 thereafter maintains its previously-held output angular deflection value, thus defeating the principal purpose of enemy jamming which is to cause erroneous output indications.

Upon termination of the interference signal the energization is removed from the winding 54, the arm 58 moves to contact 61, and usual operation of the radar system is restored.

What is claimed is:

1. An anti-jamming circuit comprising, a Doppler radar system capable of operating in a normal or a memory mode, a transmitter in said Doppler radar system, a frequency tracker in said Doppler radar system, said frequency tracker containing a resonant filter and having an input including a Doppler frequency spectrum and noise, means abstracting a noise signal from said Doppler frequency spectrum and noise input, means deriving a Doppler-derived signal from said resonant filter, differential means for subtracting the amplitudes of two signals, means applying said noise signal thereto, cyclic means periodically silencing the transmitter of said Doppler radar system and applying said Doppler-derived signal to said differential means, and means operated by said differential means for switching said Doppler radar system from its normal mode of operation to its memory mode when said Doppler-derived signal exceeds said noise signal.

2. An anti-jamming circuit comprising, a Doppler radar system capable of operating in normal or memory mode, said system containing a microwave transmitter, a microwave receiver and a frequency tracker, said frequency tracker containing a resonant filter and receiving a Doppler frequency spectrum and noise input from said microwave receiver, differential means for sensing the difference of two signals, filter means deriving a noise signal from said Doppler frequency spectrum and noise input, means applying said noise signal to said differential means, cyclic means silencing said microwave transmitter and applying a Doppler-derived signal from said resonant filter to said differential means, and means operated by said differential means to switch said Doppler radar system from its normal mode of operation to its memory mode when said Doppler-derived signal exceeds said noise signal.

3. An anti-jamming circuit comprising, a Doppler radar system capable of operating in either a normal mode or a memory mode, said system containing a microwave transmitter, a microwave receiver emitting a combined Doppler and noise signal, and a frequency tracker, said frequency tracker containing a resonant filter having an output emitting a Doppler-derived signal, bandpass filter means isolating a noise signal from said combined Doppler and noise signal, differential means, means applying said noise signal to said differential means, cyclic switching means periodically disabling said transmitter and connecting said resonant filter output to said differential means, and means operated by said differential means switching said Doppler radar system from normal to memory mode when said Doppler-derived signal exceeds said noise signal.

4. An anti-jamming circuit comprising, a Doppler radar system capable of operating in either a normal mode or a memory mode, said system containing a microwave transmitter, a microwave receiver emitting a combined Doppler and noise signal, and a frequency tracker containing a resonant filter having a Doppler-derived signal output, bandpass filter means isolating a noise signal from said combined Doppler and noise signal, differential circuit means having first and second output terminals, means applying said noise signal to said differential circuit means, cyclic switching means periodically disabling said transmitter and applying said Doppler-derived signal output to said differential circuit means whereby when the Doppler-derived signal is stronger than said noise signal said differential relay first output terminal is energized and otherwise the second output terminal is energized, and relay means operated from said first output terminal switching said system to its memory mode and locking said cyclic switching means in its periodic transmitter disabling position.

5. An anti-jamming circuit for a Doppler radar system comprising, a vehicle carried transmitter generating a transmitter signal, means directing said transmitter signal toward a target surface and for receiving reflected echo signals therefrom, said echo signals consisting of a Doppler signal frequency spectrum combined with noise signals, converting means having a normal mode of operation and a memory mode of operation, said converting means in its normal mode of operation converting said Doppler signal into an indication of the present speed of said vehicle and in its memory mode retaining said speed indication at that value attained just prior to operation to said memory mode, differential means having only said noise signals applied to a first input thereof, means periodically preventing the radiation of said transmitter signal and simultaneously applying combined Doppler and noise signals to a second input of said differential means, and means connected to the output of said differential means for operating said converting means in its memory mode when the signal applied to said second input exceeds that applied to said first input.

6. An anti-jamming circuit as set forth in claim 5 including means operated by the means connected to the output of said differential means for preventing radiation of said transmitter signal during those periods during which the signal applied to said second input exceeds that applied to said first input.

7. An anti-jamming circuit as set forth in claim 6 including additional means for continuously applying combined Doppler plus noise signals to said second input during the periods during which the signal applied to said second input exceeds that applied to said first input.

8. An anti-jamming circuit for a Doppler radar system comprising, a vehicle carried transmitter generating a transmitter signal, means directing said transmitter signal toward a target surface and for securing reflected echo signals therefrom, a receiver having said echo signals impressed thereon and producing therefrom a Doppler frequency spectrum of signals combined with noise signals, converting means having a normal mode of operation and a memory mode of operation, said converting means in its normal mode of operation converting said Doppler signals into an indication of present speed of said vehicle and in its memory mode retaining said speed indication at that value attained just prior to operation to said memory mode, comparator means having a pair of inputs, means for applying only the noise signal output of said receiver to one of said pair of inputs, means periodically preventing radiation of said transmitter signal and simultaneously imposing both Doppler and noise signals to the other of said pair of inputs, and means operated by said comparator means for retaining said converter means in its normal mode when the signal applied to said other input does not exceed the signal applied to said one input and for operating said converter means in its memory mode when the signal applied to said other pair of inputs exceeds that applied to said one input.

9. An anti-jamming circuit as set forth in claim 8 including means operated by said compensator for preventing radiation of said transmitter signal as long as the signal applied to said other input exceeds that applied to said one input.

10. An anti-jamming circuit as set forth in claim 9 including means operated by said comparator for continuously applying Doppler plus noise signals to said other input as long as the signal strength thereof exceeds the strength of the signals applied to said one input.

11. An anti-jamming circuit for a Doppler radar system comprising, a vehicle carried transmitter generating a transmitter signal, means directing said transmitter signal toward a target surface and for receiving reflected echo signals therefrom, a receiver having said echo signals impressed thereon and producing therefrom a Doppler frequency spectrum of signals combined with noise signals, converting means having a normal mode of operation and a memory mode of operation, said converting means in its normal mode of operation converting said Doppler signals into an indication of present speed of said vehicle and in its memory mode retaining said speed indication at that value attained just prior to operation to said memory mode, a differential amplifier comprising a pair of tubes each having at least an anode, cathode and control electrode, said cathodes being connected to a potential supply source through a common resistor, a polarized relay having opposed differential windings connected in series between said anodes, the static bias of said tubes being so adjusted that said polarized relay is actuated to one position when the signal applied to one of said control electrodes does not exceed the signal applied to the other of said control electrodes and is actuated to a second position when the signal applied to said one control electrode exceeds the signal applied to the other control electrode, means applying only the noise signal output to said other control electrode, means periodically preventing radiation of said transmitter signal and simultaneously imposing both Doppler and noise signals on said one of said control electrodes, and means operated by the actuation of said polarized relay to its second position for operating said converting means to its memory mode of operation.

12. An anti-jamming circuit as set forth in claim 11 including relay contact means operated in response to the actuation of said polarized relay to its second position for inhibiting radiation of said transmitted signal.

13. An anti-jamming circuit as set forth in claim 12 including relay contact means operated in response to the actuation of said polarized relay to its second position for maintaining the imposition of said Doppler plus noise signal on said one control electrode.

No references cited.